Aug. 15, 1950  C. L. OSWALD  2,518,812
SAFETY OUTLET BOX WITH PILOT LIGHT
Filed July 6, 1948

Carl L. Oswald
INVENTOR

BY Edward Taylor
ATTORNEYS

Patented Aug. 15, 1950

2,518,812

UNITED STATES PATENT OFFICE 2,518,812

SAFETY OUTLET BOX WITH PILOT LIGHT

Carl L. Oswald, Weston, Vt.

Application July 6, 1948, Serial No. 37,279

5 Claims. (Cl. 177—311)

1

This invention relates to improvements in safety or fused outlet boxes or receptacles, particularly adapted for domestic use with one or more electrical appliances. The connection of an appliance to the main wiring system frequently results, during momentary overload, and blowing the main fuses of the system. These main fuses are usually relatively inaccessible, and the usual remedy for the resulting inconvenience has been to fuse the appliance to a load sufficiently below that to which the main fuses are set so that the appliance fuse will open before the main fuse. This is wasteful of the carrying capacity of the line. An alternative remedy is to use a main line fuse of a capacity greater than that which the line is safely able to take, and to fuse the appliance at the safe capacity of the line. Since a line should never be fused at a rate above its safe capacity this is not only dangerous but is forbidden by electrical codes.

It is one object of the invention to provide a safety outlet box or receptacle which can be fused to the same value as the main line to which it is connected, but which will always open its own fuse before that in the main line. In this way the full capacity of the line may be utilized without danger of opening a main fuse. A further object is to provide a positive indication as to whether the main fuse is intact in the case of failure of the appliance to operate. While the invention is of particular utility in the use of photographic apparatus, on account of the momentary overloads liable to occur in such use, it is not restricted to use with this type of apparatus.

The invention will now be described with reference to the accompanying drawing, in which Fig. 1 is a plan view of a plug-in receptacle constructed in accordance with the invention;

Figure 1:
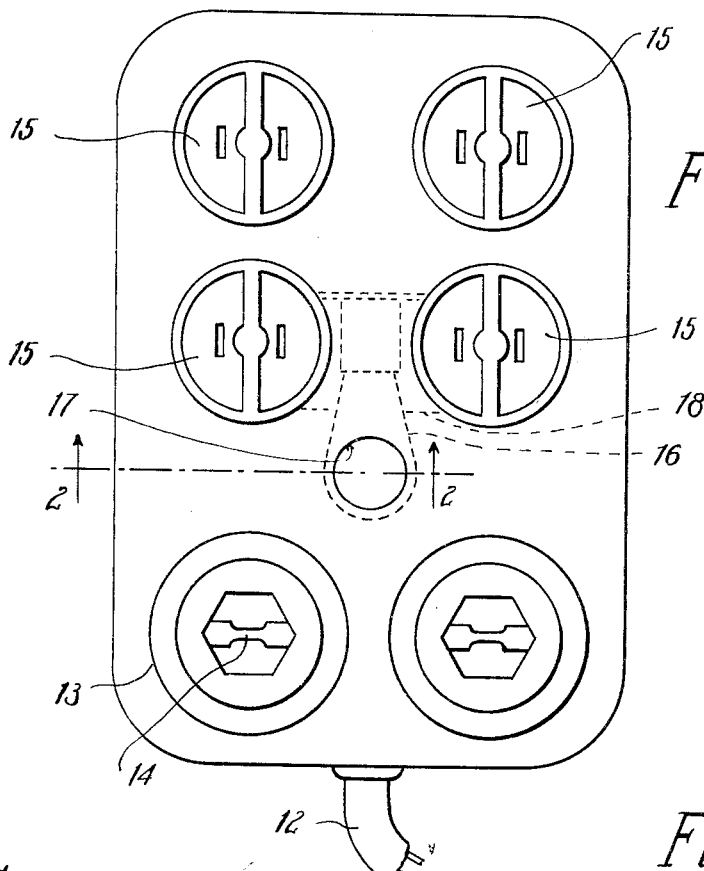
Figure 2:
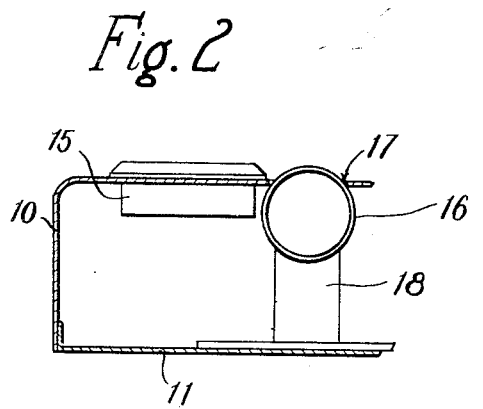
Fig. 2 is a section on line 2—2 of Fig. 1.

In the form of receptacle chosen for illustration a case 10, preferably of sheet metal and provided with a bottom closure 11, receives a two-wire cable 12 having a plug (not shown) adapted to be plugged into any receptacle on the line. The case 10 has screw sockets 13 to receive fuses 14, one preferably for each side of the line in case there are to be a plurality of outlets, and one or more (four as shown) plug-in receptacles or outlets 15 bridged across the line. A pilot light 16 is connected across the line, and preferably is located in heat-conducting, or at least heat-radiating position relative to the fuses. Preferably the pilot light 16 is positioned so that its glass envelope is in glass to metal contact with a portion of the case sufficiently close to the fuses so that they will be raised in temperature substantially above the temperature of the ambient air. This may very simply be done by locating the lamp 16 within the case 10 just under an aperture 17 in the latter, and with the aperture sufficiently close to the fuses so that the heat of the pilot light will be transmitted to the fuses. In the form shown for illustration the light is located on a perpendicular line between the fuses and as near to them as mechanical and electrical considerations permit. A support bracket 18 for the lamp socket may be mounted in the case in any desired way.

It is further desirable that the bulb of the pilot light be formed of, or covered with, some substance restricting transmission of the entire spectrum emitted from the filament so that a substantial part of the energy of this spectrum will be retained as heat rather than radiated as light. Such an effect is known in the common Christmas tree lights which employ bulbs of collored glass or glass coated with a colored film. With such bulbs the restriction of the spectrum emitted as light evidences itself in the production of heat, a usually undesirable effect which in the present case is applied to the purpose of pre-heating the fuses and thus causing them to burn out and open at an earlier time than the colder fuses in the main line. Even the use of a small light can cause considerable elevation in temperature. With a 110 volt small-socket red lamp of the Christmas tree type the heat transmitted to the fuses may easily run 20–25° C. above normal room temperature. Obviously a special heating resistance may be used if the lamp is of a type, like a neon diode, which does not emit heat; but the double function of the colored lamp makes it preferable for the purpose.

The pilot light is connected across the main line directly rather than through the fuses. It thus not only performs the function described above of pre-heating the receptacle box fuses, but also the additional function of indicating whether or not the main line fuses are in operative condition. As long as the pilot light is burning the main line fuses are intact, and the user knows that all that is necessary to do to restore the box to operative condition after an overload is to replace a fuse mounted on it.

Figure 3:
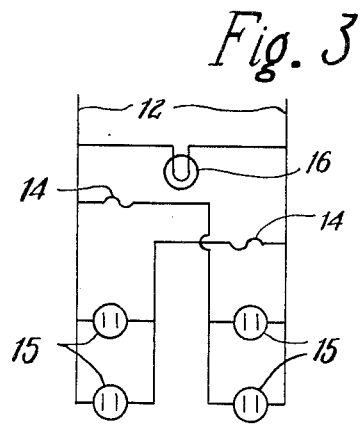
Fig. 3 is a schematic wiring diagram thereof.

The circuit shown for illustration in Fig. 3 has two main line wires 12 each of which is connected directly to a pair of receptacles and through one of the fuses 14 to the other pair. By this arrangement there is only one fuse in series with the main house fuse (the latter being assumed to be on one side of the line only as is customary) so that the same value fuse can be placed in the receptacle as in the main fuse box. Were the main circuit fused on both sides the same arrangement of double fusing should be followed in the box 10. As stated above, the lamp 16 is connected directly across the main line.

What I claim is:

1. An electrical outlet box having terminals for connection to appliances, terminals for connection to a power supply, wiring connecting the two sets of terminals including one or more fuses in series therewith, and a lamp bridged across the second named terminals and thus energized whenever said terminals are supplied with current, said lamp being located in adjacency to said fuses to transfer heat thereto and serving both as a pilot light indicating when said terminals are supplied with current and as means for maintaining the fuses at a temperature above that of the ambient air to decrease the duration of overload necessary to cause melting.

2. An electrical outlet box comprising a metal casing said casing supporting terminals for connection to appliances, terminals for connection to a power supply, and containing wiring connecting the two sets of terminals including one or more fuses in series therewith, and an incandescent lamp bridged across the second named terminals and thus energized whenever said terminals are supplied with current, said lamp being in substantially glass to metal contact with a portion of the metal casing in heat conducting relation to the fuses, whereby the lamp serves both as a pilot light indicating when said terminals are supplied with current and as means for maintaining the fuses at a temperature above that of the ambient air to decrease the duration of overload necessary to cause melting.

3. An electrical outlet box as claimed in claim 1 in which the lamp has a pigmented envelope restricting the energy radiated as light and increasing the proportion of energy given off as heat.

4. An electrical outlet box comprising a metal casing, said casing supporting terminals for connection to appliances, terminals for connection to a power supply, and containing wiring connecting the two sets of terminals including one or more fuses in series therewith, said casing being provided with an aperture in a wall thereof, and an incandescent lamp bridged across the second-named terminals and located within the casing adjacent said aperture and in heat conducting relation to the fuses, whereby the lamp serves both as a pilot light indicating when said terminals are supplied with current and as means for maintaining the fuses at a temperature above that of the ambient air to decrease the duration of overload necessary to cause melting.

5. An electrical outlet box comprising a metal casing, said casing supporting terminals for connection to appliances, terminals for connection to a power supply, and containing wiring connecting the two sets of terminals including one or more fuses in series therewith, said fuses being supported in heat-conducting relation to a wall of the casing, said casing being provided with an aperture in said wall, and an incandescent lamp bridged across the second-named terminals and located within the casing in substantially glass to metal contact with the wall surrounding said aperture, the latter being located sufficiently close to the fuses to permit heat transfer from the lamp to the fuses through said casing wall, whereby the lamp serves both as a pilot light indicating when said terminals are supplied with current and as means for maintaining the fuses at a temperature above that of the ambient air to decrease the duration of overload necessary to cause melting.

CARL L. OSWALD.

REFERENCES CITED

The following references are of record in the file of this patent:

UNITED STATES PATENTS

| Number | Name | Date |
|---|---|---|
| 1,314,218 | Rodrigues | Aug. 26, 1919 |
| 1,583,496 | Shafer | May 4, 1926 |
| 1,689,809 | Vaughan | Oct. 30, 1928 |
| 1,757,951 | Breese | May 13, 1930 |
| 1,874,828 | Suss | Aug. 30, 1932 |
| 1,876,636 | Dicke | Sept. 13, 1932 |
| 1,887,696 | Medlin | Nov. 15, 1932 |
| 1,983,449 | Frank | Dec. 4, 1934 |
| 2,001,671 | Villa | May 14, 1935 |
| 2,129,477 | Parks | Sept. 6, 1938 |